United States Patent
Yoshida

(10) Patent No.: US 6,812,934 B1
(45) Date of Patent: *Nov. 2, 2004

(54) IMAGE PROCESSING METHOD AT THE TIME OF CHARACTER DISPLAY IN AN IMAGE APPARATUS

(75) Inventor: Noboru Yoshida, Daito (JP)

(73) Assignee: Funai Electric Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/738,454

(22) Filed: Oct. 30, 1996

(30) Foreign Application Priority Data

Nov. 2, 1995 (JP) ............................................. 7-285512

(51) Int. Cl.$^7$ ................................................ G09G 5/00
(52) U.S. Cl. ........................ 345/636; 348/586; 348/589
(58) Field of Search ........................... 345/22, 113, 114, 345/115, 116, 141, 435, 150–154, 629, 634–636; 348/582, 584, 586, 587, 589, 592, 599, 600, 662

(56) References Cited

U.S. PATENT DOCUMENTS

| | | | | |
|---|---|---|---|---|
| RE32,305 E | * | 12/1986 | Baer | ............................. 463/3 |
| 4,924,299 A | * | 5/1990 | Mizuno et al. | ............. 345/113 |
| 4,928,231 A | * | 5/1990 | Hunt et al. | .................... 345/22 |
| 5,307,088 A | * | 4/1994 | Inuzuka et al. | ............. 345/153 |
| 5,506,603 A | * | 4/1996 | Kawano et al. | ............. 345/154 |
| 5,532,741 A | * | 7/1996 | Tsutsumi | ..................... 345/141 |
| 5,583,577 A | * | 12/1996 | Tsukagoshi | ................. 348/468 |
| 5,663,768 A | * | 9/1997 | Yang | .......................... 348/557 |
| 5,691,779 A | * | 11/1997 | Yamashita et al. | .......... 348/645 |
| 5,847,691 A | * | 12/1998 | Mistrot | ....................... 345/115 |

FOREIGN PATENT DOCUMENTS

| JP | 52044117 | 4/1977 |
|---|---|---|
| JP | 56-51676 | 7/1981 |
| JP | 4017487 | 1/1992 |
| JP | 4353899 | 12/1992 |

* cited by examiner

Primary Examiner—Kent Chang
(74) Attorney, Agent, or Firm—Bacon & Thomas, PLLC

(57) ABSTRACT

An image processing method at the time of character display in an image apparatus having a section for super-imposing character display on an ordinary dynamic picture image. In the method, the level of "color depth" of the dynamic picture image is automatically controlled at the time of character display to thereby make it easy to see character display. Specifically, when character display is effected in monochrome, the dynamic picture image is displayed in a color other than monochrome. When character display is effected in a color other than monochrome, the dynamic picture image is displayed in monochrome.

5 Claims, 3 Drawing Sheets

IMAGE PROCESSING METHOD AT THE TIME OF CHARACTER DISPLAY IN AN IMAGE APPARATUS

BACKGROUND OF THE INVENTION

1. Field of the Invention

The present invention relates to an image processing method at the time of character display in an image apparatus. The image apparatus has a display unit such as a cathode-ray tube (CRT), a liquid crystal display (LCD) or a plasma display, on which RGB signals, a video signal or a composite signal thereof can be displayed. The image apparatus constitutes the whole or part of a television receiver set, a video recording/reproducing apparatus, a computer terminal or a communication terminal equipment.

2. Discussion of the Related Art

Heretofore, for character display, there is a method in which character display is superimposed on a screen the whole of which is painted with a single solid color (a screen painted with a single color is displayed). Further, there is another method in which an earlier signal and a later signal than a character pattern signal are generated to thereby perform edging on the periphery of a character pattern (see Japanese Patent Examined Publication No. Sho. 56-51676, Title of the Invention: CONTOUR ERASING DEVICE OF A CHARACTER SIGNAL).

In the method in which the whole of a screen is painted with a single solid color, however, there arises a disadvantage that a dynamic picture image cannot be seen at all.

On the other hand, in the method in which edging is performed on the periphery of a character pattern, there arises a disadvantage that the circuit configuration becomes complicated to thereby increase the cost.

SUMMARY OF THE INVENTION

An object of the present invention is to provide an image processing method in which character display very easy to see is superimposed on a dynamic picture image or a still picture image by a relatively simple circuit configuration at the time of character display.

To achieve the foregoing object, the invention provides an image processing method at the time of character display in an image apparatus having means for superimposing character display on a picture image, wherein a level of "color depth" of the picture image is automatically controlled when character display is effected.

DETAILED DESCRIPTION OF THE PREFERRED EMBODIMENT

An embodiment of the present invention will be described below with reference to the accompanying drawings.

Figure 1:
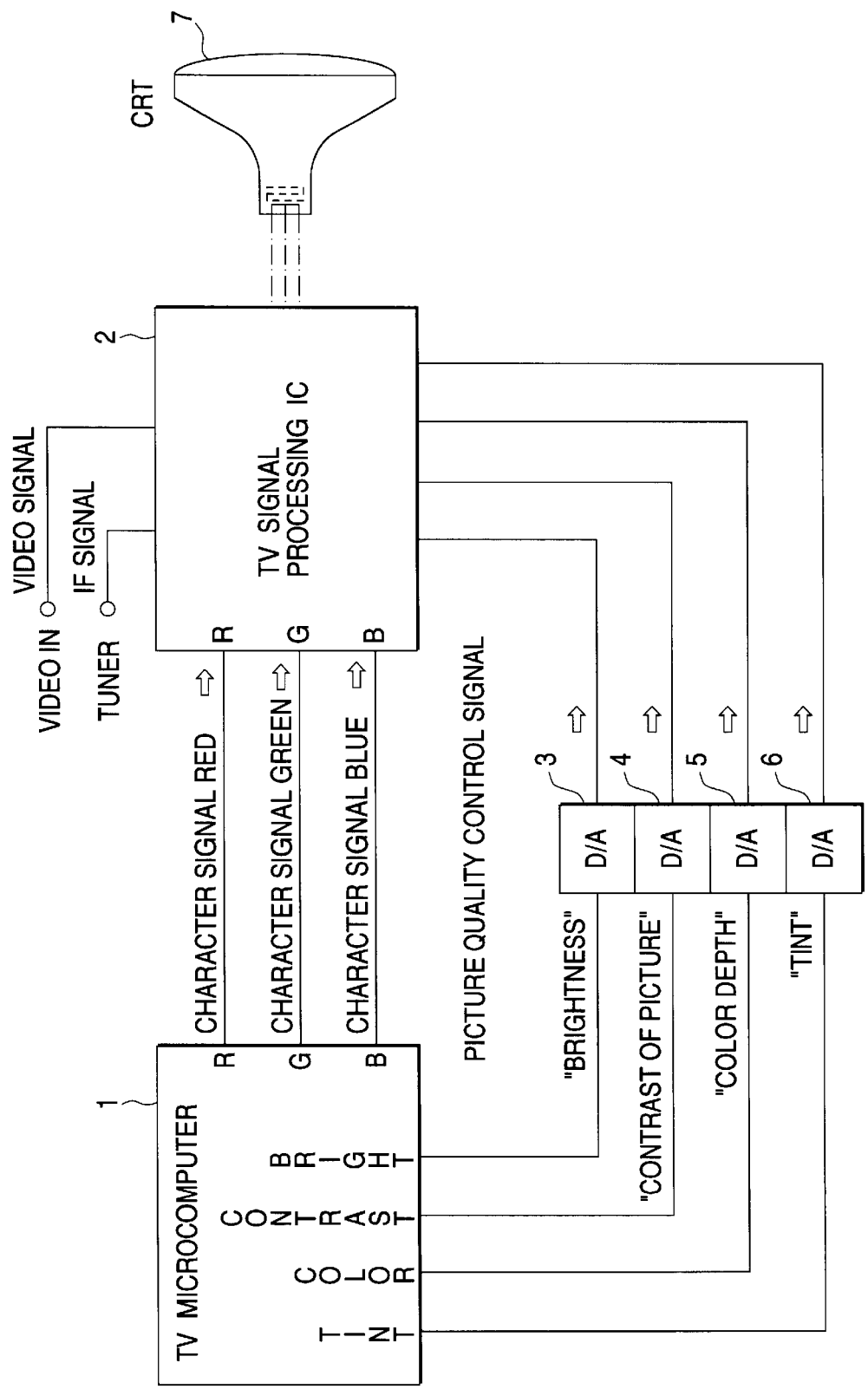
FIG. 1 is a block diagram showing a television receiver set having a character display circuit to embody the present invention.

FIG. 1 is a block diagram showing a television receiver set as an image apparatus having a character display circuit to embody the present invention.

Character signals R, G and B outputted from a TV microcomputer 1 are inputted to a TV signal processing IC 2. Further, picture quality control signals BRIGHT (brightness), CONTRAST (contrast of picture), COLOR (which those skilled in the art will understand to be the gain of the chrominance circuit, also known as the overall chroma level or color depth and TINT (tint) outputted from the TV microcomputer 1 are inputted to the TV signal processing IC 2 through D/A converters 3, 4, 5 and 6, respectively.

An intermediate frequency (IF) signal from a TUNER terminal or a video signal from a VIDEO IN terminal is inputted to the TV signal processing IC 2. A signal processed by the TV signal processing IC 2 is inputted to a CRT 7.

Next, the operation of the character display circuit will be described below.

At the ordinary time, with respect to the video signal or IF signal processed by the TV signal processing IC 2 (the IF signal is demodulated to a video signal and then subjected to image processing by the IC 2), the picture quality control signals of a picture quality level set by a user are inputted to the IC 2 to thereby keep the picture quality constant.

Figure 2:
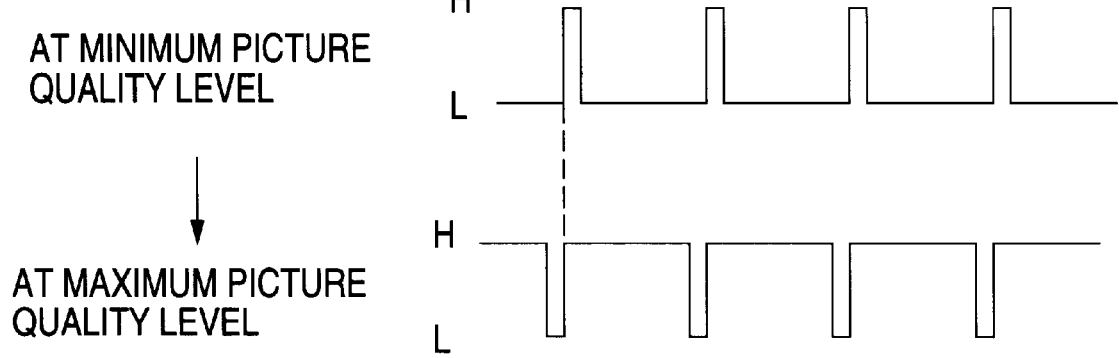
FIG. 2 is a chart showing an output signal of a port COLOR of a TV microcomputer in FIG. 1.

For example, when the present time or the present channel is displayed, that is, when character signals requiring the change of "color depth" of a dynamic picture image are outputted from the TV microcomputer 1 in this condition, predetermined data previously stored in a memory (not shown) is outputted from a port COLOR of the TV microcomputer 1. Assuming now that the picture quality level decreases (the chroma level in "color depth" decreases) as the voltage for the picture quality control of the TV signal processing IC 2 decreases, then the signal outputted from the port COLOR of the TV microcomputer 1 is a signal set as shown in FIG. 2.

This signal is converted into a voltage of a predetermined level by the D/A converter 5 for COLOR (color depth), so that the voltage is inputted to the TV signal processing IC 2. Then, the video signal of the chroma level thus changed and the character signals are outputted while superimposed, so that a dynamic picture image and a character image are displayed by the CRT 7. This serves as means for superimposing character display on an ordinary dynamic picture image.

Figure 3:
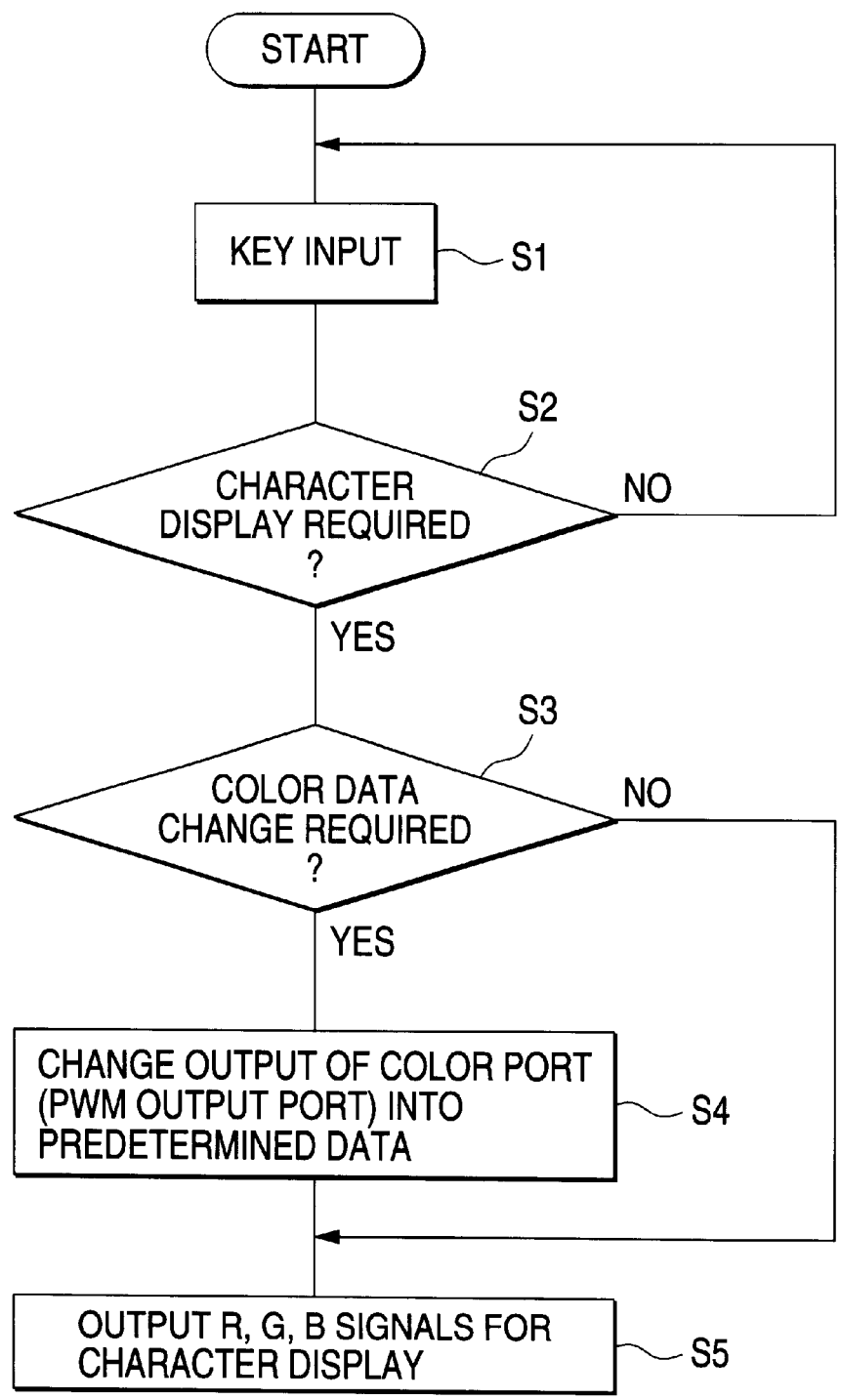
FIG. 3 is a flow chart showing the operation of the TV microcomputer in FIG. 1.

FIG. 3 is a flow chart showing the embodiment of the image processing method at the time of character display in the image apparatus according to the present invention.

In step S1, a key of a remote controller or a key of an image apparatus body is pushed down. In step S2, a judgment is made as to whether the key thus pushed down requires character display or not.

In step S3, a judgment is made as to whether the requirement of character display includes the change of COLOR data or not. In step S4, the data to be outputted from the port COLOR of the TV microcomputer 1 is changed into predetermined data. In step S5, character signals R, G and B are outputted.

Specifically, when character display is effected in monochrome, the dynamic picture image is displayed in a color other than monochrome. When character display is effected in a color other than monochrome, the dynamic picture image is displayed in monochrome.

Although the above description has been made about the case where the background image displayed in the image apparatus is a dynamic picture image, the image processing method can be also applied to a still picture image (inclusive of a time-lapse image or the like) as the background image without any technical consideration.

As described above, the image processing method at the time of character display in the image apparatus according to the present invention is configured so that the microcomputer sends out a predetermined output to change the level of "color depth" on the basis of the output at the time of character display. Accordingly, character display becomes easy to see. In this manner, according to the present invention, character display can become easy to see securely without use of any complex circuit under the condition in which a dynamic picture image or a still picture image is displayed.

What is claimed is:

1. An image processing method for use at the time of character display in an image display apparatus having:

a TV signal processing integrated circuit; and means including a microcomputer for superimposing a character display on a picture image, wherein:

the microcomputer includes a TINT output, a COLOR output, a CONTRAST output, and a BRIGHTNESS output, the TINT, COLOR, CONTRAST, and BRIGHTNESS outputs being respective connected to corresponding inputs of the TV signal processing integrated circuit, and the microcomputer further includes character signal red, character signal green, and character signal blue outputs connected to R, G, and B inputs of the TV signal processing integrated circuit, and the corresponding input of the TV signal processing integrated circuit to which the COLOR output of the microcomputer is connected controls the chroma level of a background of the character display, wherein the microcomputer outputs a COLOR signal from the COLOR output of the microcomputer in order to set the chroma level of the background of the character display whenever a character display is superimposed on the picture image.

2. The image processing method according to claim 1, wherein the chroma level is set to display the picture image in a color other than monochrome when character display is effected in monochrome.

3. The image processing method according to claim 1, wherein the chroma level is set to display the picture image in monochrome when character display is effected in a color other than monochrome.

4. The image processing method according to claim 1, wherein the picture image is a dynamic picture image.

5. The image processing method according to claim 1, wherein the picture image is a still picture image.

\* \* \* \* \*